US009483245B2

(12) United States Patent
Asayag et al.

(10) Patent No.: US 9,483,245 B2
(45) Date of Patent: Nov. 1, 2016

(54) MATCHING DATABASE SCHEMA WITH APPLICATION CODE USING DEPENDENCY MANAGEMENT

(71) Applicant: Red Hat Israel, Ltd., Raanana (IL)

(72) Inventors: Moti Asayag, Netanya (IL); Yair Zaslavsky, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 43 days.

(21) Appl. No.: 13/748,444

(22) Filed: Jan. 23, 2013

(65) Prior Publication Data

US 2014/0208303 A1    Jul. 24, 2014

(51) Int. Cl.
*G06F 21/57* (2013.01)
*G06F 9/445* (2006.01)
*G06F 9/44* (2006.01)
*G06F 17/30* (2006.01)
*G06F 9/455* (2006.01)

(52) U.S. Cl.
CPC . *G06F 8/61* (2013.01); *G06F 8/68* (2013.01); *G06F 17/30* (2013.01); *G06F 9/45533* (2013.01)

(58) Field of Classification Search
CPC .............. G06F 7/78; G06F 8/00–8/78; G06F 9/44–9/455; G06F 11/36
See application file for complete search history.

(56) References Cited

U.S. PATENT DOCUMENTS

| 2005/0257216 | A1* | 11/2005 | Cornell et al. ................ 717/177 |
| 2006/0161558 | A1* | 7/2006 | Tamma ............... G06F 11/0709 |
| 2008/0028389 | A1* | 1/2008 | Genty et al. .................. 717/174 |
| 2011/0016461 | A1* | 1/2011 | Bankston et al. ............. 717/170 |
| 2011/0213759 | A1* | 9/2011 | Zazrivec et al. .............. 707/695 |
| 2012/0291005 | A1* | 11/2012 | Quine ................. G06F 9/45529 717/105 |
| 2013/0117738 | A1* | 5/2013 | Livingston ................ G06F 8/65 717/168 |
| 2014/0095432 | A1* | 4/2014 | Trumbull et al. ............. 707/610 |
| 2014/0137073 | A1* | 5/2014 | Dees, Jr. ............ G06F 11/0709 717/101 |

FOREIGN PATENT DOCUMENTS

CN           102495733 A  *  6/2012

OTHER PUBLICATIONS

Curino et al., Automating the database schema evolution process, 2013.*

* cited by examiner

*Primary Examiner* — Wei Zhen
*Assistant Examiner* — Zhan Chen
(74) *Attorney, Agent, or Firm* — Lowenstein Sandler LLP (57) ABSTRACT

A package manager receives a request to install a version of an application on a host server, the version of the application having an associated database script provided by database scripts package. The package manager determines a currently installed schema in a management database associated with the host server and compares the database script associated with the application to the currently installed schema in the management database. Prior to installing the version of the application, the package manager verifies that the database script is installed and updated to match the database schema and performs the database upgrade if required.

18 Claims, 4 Drawing Sheets

MATCHING DATABASE SCHEMA WITH APPLICATION CODE USING DEPENDENCY MANAGEMENT

TECHNICAL FIELD

This disclosure relates to the field of virtualization and, in particular, to matching database schema with application code using dependency management.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the virtual machine.

A host controller in the virtualization system may include a virtualization manager to manage the allocation of resources from host servers to virtual machines, monitor the status of the virtual machines, as well as the progress of commands and processes being executed by the virtual machines and generally manage operations in the system. The host controller may maintain a management database with entries pertaining to the various entities in the virtualization system (e.g., host computers, virtual machines, virtual disks). Each entry may include data representing the status of the corresponding entity. The database may be organized according to a particular schema. The schema defines the structure of the database and controls the organization of the data.

In order to function properly, the virtualization manager, and any scripts that are run on the database, should be compatible with the database schema. Verifying this compatibility is often a complicated process involving calculating and comparing checksums or other hash values for each entry. If the verification is not done, however, errors can result since the data may not actually be organized as expected by the virtualization manager.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for matching database schema with application code using dependency management. In one embodiment, a virtualization system may include a host controller that manages operations of host computers, virtual machines, virtual disks and other entities in the system. The host controller may include a virtualization manager to manage the allocation of resources (e.g., storage, processing power) from host servers to virtual machines, monitor the status of the virtual machines, as well as the progress of commands and processes being executed by the virtual machines and generally manage operations in the virtualization system. The host controller may maintain a management database with entries pertaining to the various entities in the virtualization system (e.g., host computers, virtual machines, virtual disks). Each entry may include data representing the status of the corresponding entity. The database may be organized according to a particular schema. The schema defines the structure of the database and controls the organization of the data.

In one embodiment, the host controller also includes a package management (or "package manager") system used to install, upgrade, or configure software packages on the host controller in a consistent manner. For example, the package manager may be used to install or upgrade the virtualization manager on the host controller. In one embodiment, the package manager may verify that the database schema installed for the current database is compatible with any database scripts that a new version of the virtualization manager may try to execute. Upon receiving a request to install or upgrade the virtualization manager, the package manager may determine the currently installed schema in the management database, compare the database scripts associated with the new virtualization manager to the to the existing database schema by running a calculation on new database package scripts which will affect the database schema if installed, and comparing the result to a previously kept calculation result of the currently installed database and determine if the database scripts are installed and updated to match the database schema. If the database scripts are installed and updated to match the database schema, the package manager may proceed with installing the new version of the virtualization manager. If the database scripts are not installed and updated to match the database schema, the package manager may invoke an upgrade script for updating the database schema with the content of a new database schema package, or take other appropriate action.

By performing this verification that the database schema and the database scripts of the virtualization manager code are compatible at installation time, the package manager avoids complicated and time consuming verification processes during run time of the virtualization manager and saves run-time errors by preventing the virtualization manager from running against an incompatible database schema. In addition, by matching the database schema with the scripts in the application code, the package manager can ensure that the virtualization manager is able to accurately access the management database without errors to provide error-free service to users of the virtualization system.

Figure 1:
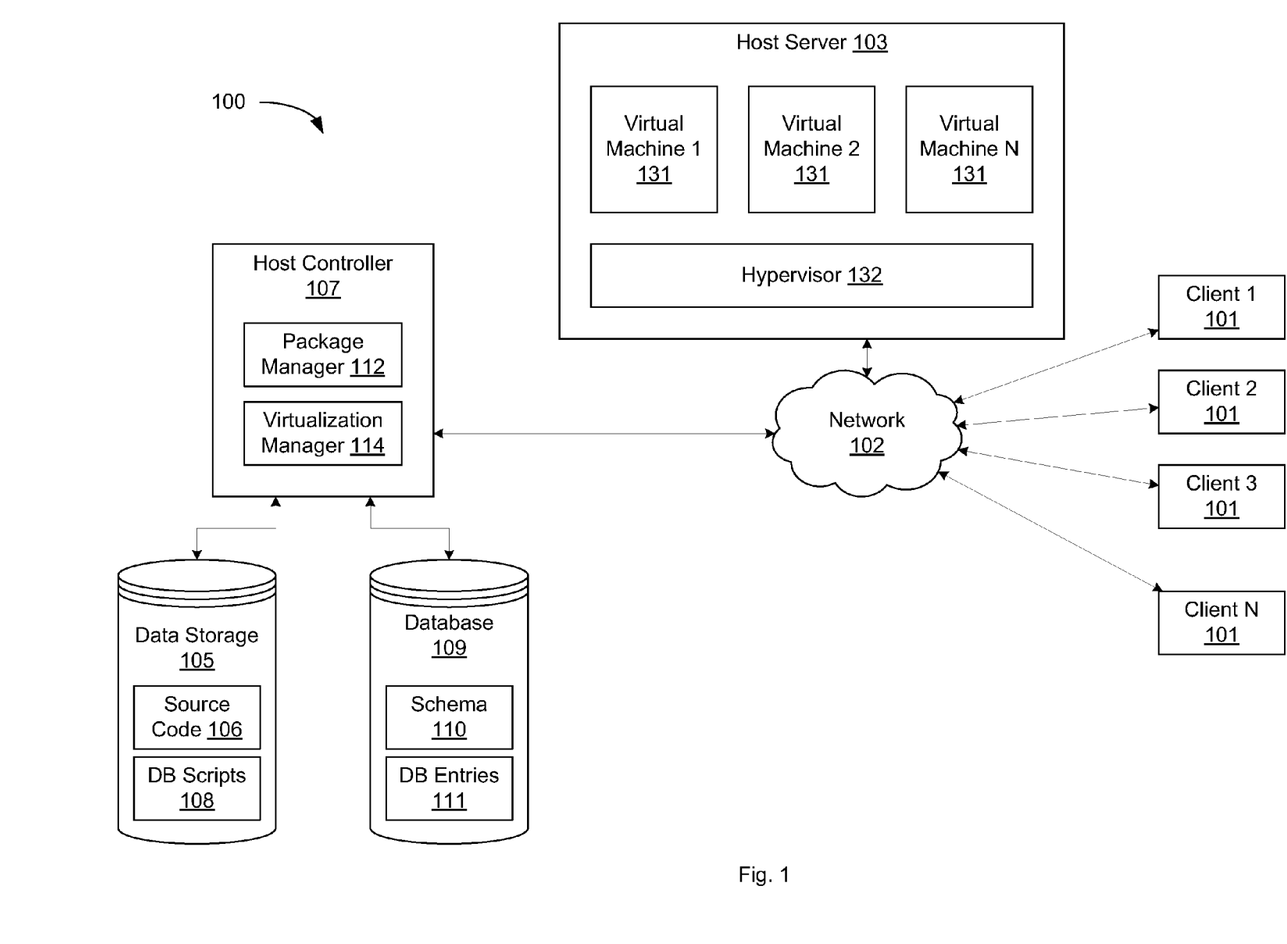
FIG. 1 is a block diagram illustrating an exemplary network architecture in which embodiment of the present invention may operate.

FIG. 1 illustrates an exemplary network architecture 100 in which embodiments of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via the same or a different network or directly). Host controller 107 may be an independent machine such as a server computer, a desktop computer, etc. Alternatively, the host controller 107 may be part of the host server 103.

In one embodiment, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM) or a kernel-based hypervisor.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks. These virtual disks can be logical partitions of a physical disk managed by hypervisor 132, can be cloud based storage devices, or can be some other type of virtual storage device. In one embodiment, virtual disks may form a whole or part of a logical data center. In one embodiment, virtual machines 131 and virtual disks, together with host servers 103, may be collectively referred to as entities in a virtual machine system.

The virtual machines 131 and virtual disks are managed by the host controller 107. Host controller 107 may manage the allocation of resources from host server 103 to virtual machines 131. In addition, host controller may monitor the status of virtual machines 131 as well as the progress of commands and processes being executed by virtual machines 131 and/or on virtual machines 131. The host controller 107 may include a virtualization manager 114 to perform management operations in the virtualization system, including for example allocating resources of host servers 103 to virtual machines 131, monitoring the status of virtual machines 131, monitoring the progress of commands and processes being executed by virtual machines 131, etc. In one embodiment, virtualization manager 114 may be the oVirt engine provided by Red Hat, Inc. of Raleigh N.C. The host controller 107 may also maintain a management database 109 used by the virtualization manager 114 for the above management operations. The management database 109 includes entries 111 pertaining to the various entities in the virtualization system (e.g., host computers, virtual machines, virtual disks). Each entry 111 may include data representing the status of the corresponding entity. The database may be organized according to a particular schema 110. The schema 110 defines the structure of the database 109 and controls the organization of the data. In one embodiment, the schema 110 includes database objects, such as Tables, Indices, Sequeneces, Stored-Procedures, and/or Constraints (primary-key, foreign key, unique-key, not null). The schema 110 may be built by a set of database scripts which contain the SQL statements for creating or modifying the database objects mentioned above. In addition, the database scripts add data to the database used by the virtualization manager to operate properly.

In one embodiment, the virtualization manager 114 includes source code 106 as well as one or more database scripts 108 that may be executed upon database 109. The database scripts 108, for example, may be designed to execute read or write operations on the entries 111 of database 109. Accordingly, the database scripts 108 should be compatible with the database schema 110 to ensure that the operations of the database scripts 108 are carried out accurately. In one embodiment, the source code 106 and database scripts 108 are maintained in data storage 105 attached to host controller 107. The data storage 105 may share the machine with the host controller 107 (e.g., a disk drive in the host controller computer) or be an independent device coupled to the host controller directly or via a network (e.g., as a network-attached storage device (NAS)). In one embodiment, database 109 may be included on the same data storage 105 (as shown in FIG. 2) or on a separate storage device.

In one embodiment, host controller 107 also includes a package manager 112 to install, upgrade, or configure software packages on the host controller 107 in a consistent manner. In one embodiment, package manager 112 is the RPM package manager from Red Hat, Inc. For example, the package manager 112 may be used to install or upgrade the virtualization manager 114 on the host controller 107. In one embodiment, the package manager 107 may verify that the database schema 110 installed for the current database 109 is compatible with any database scripts 108 that a new version of the virtualization manager 114 may try to execute. Upon receiving a request to install or upgrade the virtualization manager 114, the package manager 112 may automatically (without any user interaction) perform the following: determine the currently installed schema 110 in the management database 109, compare the database scripts 108 associated with the new virtualization manager 114 to the database schema 110 and determine if the database scripts 108 are installed and updated to match the database schema 110. If the database scripts 108 are installed and updated to match the database schema 110, the package manager 112 may automatically (without any user interaction) proceed with installing the new version of the virtualization manager 114. In on embodiment, the database scripts 108 match the database schema 110 if the scripts 108 are compatible with the current schema 110. In other words, they match if the scripts 108 can execute on the database without encountering any errors attributable to the schema 110. If they don't match, an error will not necessarily occur, but the possibility of receiving incorrect data in response to a database query may exist. If the database scripts 108 are not installed and updated to match the database schema 110, the package manager 112 may automatically (without any user interaction) invoke an upgrade script for updating the database schema with the content of a new database schema package, or take other appropriate action. Additional details of package manager 112 will be provided below.

Figure 2:
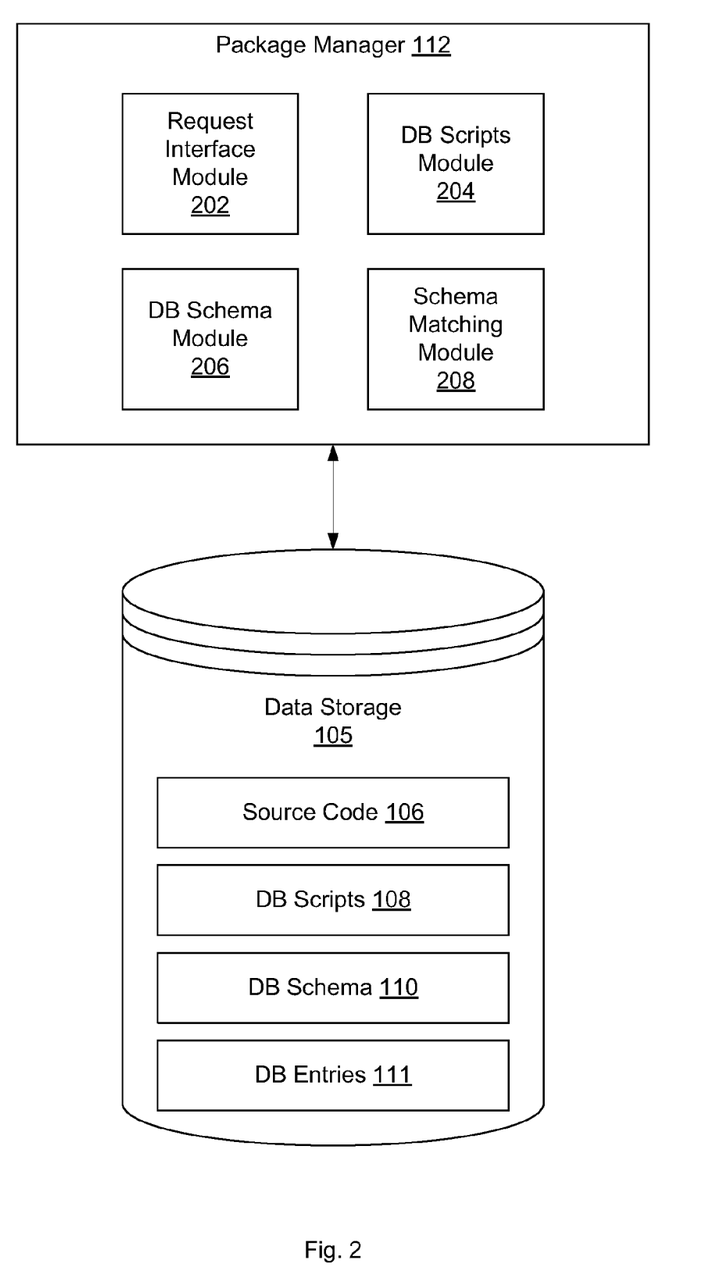
FIG. 2 is a block diagram illustrating a package manager for matching database schema with application code, according to an embodiment.

FIG. 2 is a block diagram illustrating a package manager for matching database schema with application code, according to an embodiment of the present invention. The package manager 112 may include request interface module 202, database scripts module 204, database schema module 206 and schema matching module 208. In one embodiment, package manager 112 is connected to data store 105, which may include source code 106 (e.g., for virtualization manager 114 or other application), database scripts 108, database schema 110 and one or more database entries 111. In other embodiments, package manager 112 may include different and/or additional components, which are not shown in order to simplify the description. Data store 105 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, request interface module 202 receives a request to install an application. The request may be to install a new application or to upgrade a currently installed application to a new version. In one embodiment, the request may be directed to a virtualization management application, such as virtualization manager 114. In other embodiments, the request may specify any other application to be installed and/or upgraded. The requests may be received at the host controller, for example, from any entity in the virtualization system, such as one of client devices 101, host server 103, virtual machines 131, or some other entity.

In one embodiment, database scripts module 204 identifies any database scripts 108 that are associated with the application (e.g., virtualization manager 114) that is being installed and/or upgraded. The database scripts 108 may include queries, instructions, etc. to be executed against management database 109. The database scripts 108 may have queries in a particular syntax and may refer to attributes in the database entries 111 by particular attribute names. In one embodiment, in order for the database scripts 108 to function properly (i.e., avoid execution errors and returning incorrect results), the syntax and attribute names should match those used by the database schema 110. Thus, upon identifying the database scripts 108, database scripts module 204 may determine a package name of the scripts, including a version identifier which identifies the syntax and attribute names used by the scripts. One example of the package name is ovirt-engine-dbscripts-3.1.0-3.fc17.noarch, where 3.1.0-3 is the version identifier. The package version assures that the virtualization manager 114 is installed with the correct dbscripts package (e.g., ovirt-engine with version 3.1.0-3 uses ovirt-engine-dbscripts with version 3.1.0-3). However, the content of the ovirt-engine-dbscripts, which is the database scripts 108, should be compared against the installed virtualization manager database. During the installation of the ovirt-engine-dbscripts, this comparison may be performed. Once the ovirt-engine-dbscripts package is installed, the ovirt-engine package (i.e., virtualization manager 114) can be installed in respect to database structure correctness, as the schema correctness was successfully executed.

In one embodiment, database schema module 206 determines the currently installed schema 110 in management database 109. Database schema module 206 may scan database 109 to locate an indication of the currently installed schema 110. In one embodiment, the schema 110 may have an associated identifier that uniquely identifies the particular schema being used. The schema defines the structure of the database 109 and controls the organization of the data in database entries 111. In one embodiment, the schema 110 specifies attribute names that stored in database entries 111. Different schema may have different names for the same attribute. For example, for the name of user of a virtual machine, different schema may refer to this attribute as, UserName, UserPrincipalName, GivenName, SurName, etc. The schema 110 may also define the query syntax to be used when accessing database 109. Thus, database schema module 206 can locate the identifier for the currently installed schema 110 to determine the appropriate attribute names and query syntax to be used when accessing database 109.

In one embodiment, schema matching module 208 compares the database scripts 108 associated with the virtualization manager 114 to the database schema 110 used in database 109. Schema matching module 208 may compare the version identifier of the database scripts package name (e.g., 3.1.0-3) to the identifier of the database schema 110 to determine if the database scripts 108 are installed and updated to match the current database schema 110. The current database scheme was created/updated using a set of database scripts provided by the current database scripts package. In one embodiment, database 109 contains a table with a hash value of each of the installed scripts 108. A hash-code calculation is performed on the set of hash-codes. The resulting value is treated as the schema identifier. The same schema identifier calculation may be done on the newly provided database schema scripts 108 which are included in the new database scripts package. Those two values are compared to detect if an upgrade is required. In one embodiment, the identifier of the database schema 110 may be the same as the scripts version identifier (e.g., 3.1.0-3) if the scripts are installed and updated to match the schema. In other embodiments, the identifier of the database schema 110 may be different than the scripts version identifier even though the scripts still match the schema. In this case, schema matching module 208 may consult a list of compatible schema identifiers to determine if the scripts are installed and updated to match the schema. If schema matching module 208 determines that the database scripts 108 are installed and updated to match the database schema 110, request interface module 202 may proceed with installing/upgrading the application. If schema matching module 208 determines that the database scripts 108 are not updated to match the database schema 110, in one embodiment, database schema module 206 may upgrade the database 109 with new schema that match the database scripts 108. The new schema may be created or updated by the execution of the newly provided database scripts 108.

Figure 3:
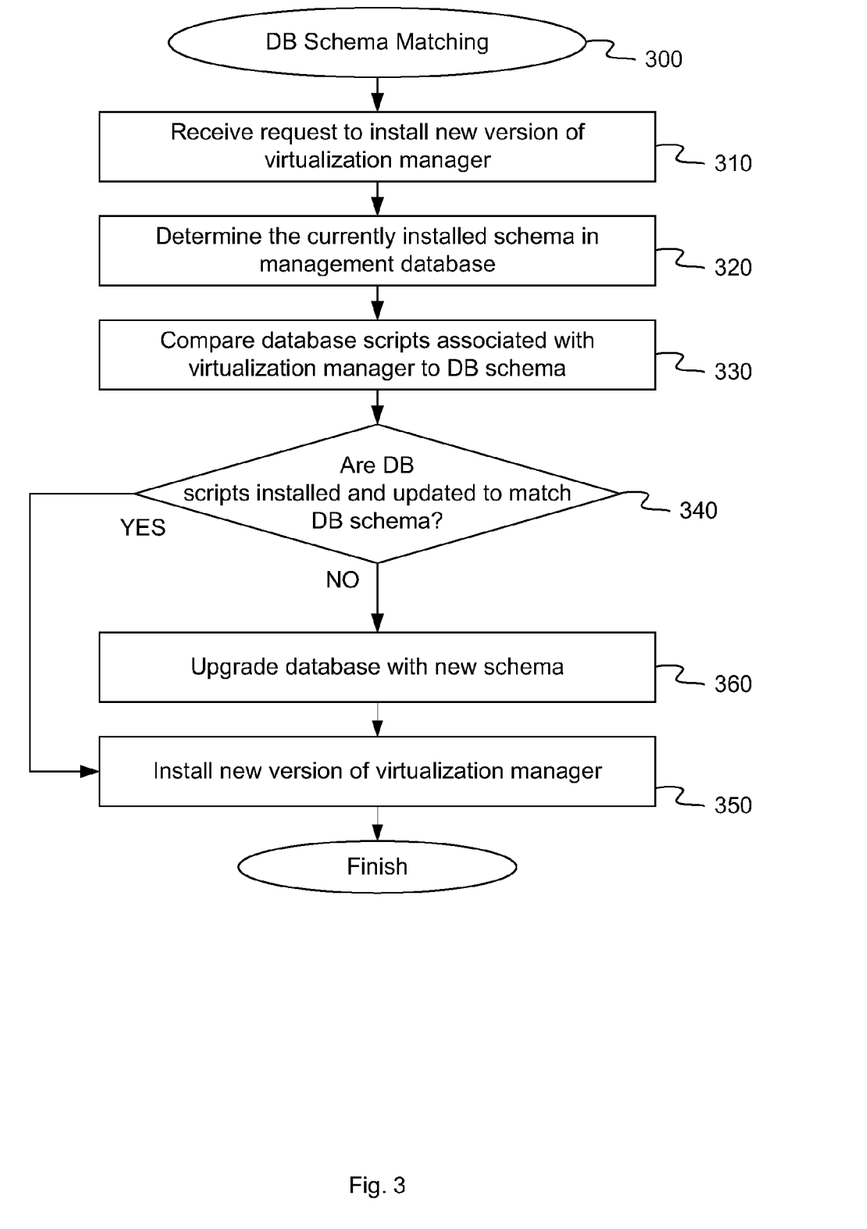
FIG. 3 is a flow diagram illustrating a method for database schema matching, according to an embodiment.

FIG. 3 is a flow diagram illustrating a method 300 for database schema matching, according to an embodiment of the present invention. The method 300 may be performed by processing logic that may comprise hardware (e.g., circuitry, dedicated logic, programmable logic, microcode, etc.), software (e.g., instructions run on a processing device to perform hardware simulation), or a combination thereof. The processing logic may match database schema with application code using dependency management. In one embodiment, the method 300 is performed by package manager 112, as shown in FIGS. 1 and 2.

Referring to FIG. 3, at block 310, method 300 receives a request to install or upgrade to a new version of an application, such as virtualization manager 114. In one embodiment, request interface module 202 receives the request, which may specify a new application to install or a currently installed application to upgrade to a new version. The request may be received at the host controller, for example, from any entity in the virtualization system, such as one of client devices 101, host server 103, virtual machines 131, or some other entity.

At block 320, method 300 determines the currently installed schema 110 in management database 109. In one embodiment, database schema module 206 scans database 109 to locate an indication of the currently installed schema 110. In one embodiment, the schema 110 may have an associated identifier that uniquely identifies the particular schema being used. The schema defines the structure of the database 109 and controls the organization of the data in database entries 111. In one embodiment, the schema 110 specifies attribute names that stored in database entries 111. The schema 110 may also define the query syntax to be used when accessing database 109. Thus, database schema module 206 can locate the identifier for the currently installed schema 110 to determine the appropriate attribute names and query syntax to be used when accessing database 109.

At block 330, method 300 compares the version of database scripts associated with the application being installed or updated (e.g., virtualization manager 114) to the database schema 110 currently installed in management database 109. In one embodiment, schema matching module 208 compares the version identifier of the database scripts package name (e.g., 3.1.0-3) to the identifier of the database schema 110 to determine if the script identifier matches the schema identifier.

At block 340, method 300 determines whether database scripts 108 are installed and updated to match the current database schema 110 based on the results of the comparison at block 330. In one embodiment, the identifier of the database schema 110 may be the same as the scripts version identifier (e.g., 3.1.0-3) if the scripts are installed and updated to match the schema. In other embodiments, the identifier of the database schema 110 may be different than the scripts version identifier even though the scripts still match the schema. In this case, schema matching module 208 may consult a list of compatible schema identifiers to determine if the scripts are installed and updated to match the schema. If the schema identifier does not match the scripts version identifier and is not found on the list of compatible schema identifiers, schema matching module 208 may determine that the database scripts 108 do not match the database schema 110.

If at block 340, schema matching module 208 determines that the database scripts 108 are installed and updated to match the database schema 110, at block 350, method 300 may proceed with installing/upgrading the application. In one embodiment, request interface module 202 may continue processing of the request to install or upgrade the application, as indicated in the request received at block 310. The new version of the application, such as virtualization manager 114 can thus function normally, interacting with management database 109 as needed. The database scripts 108 associated with virtualization manager 114 are not likely experience any errors attributable to a conflict with the schema 110 of database 109. Package manager 112, or other program on host controller 107, also will not need to perform complicated and time consuming verification processes during run time of the virtualization manager 114, since it was established at installation time that the database scripts 108 are installed and updated to match the current database schema 110.

If at block 340, schema matching module 208 determines that the database scripts 108 do not match the database schema 110, in one embodiment, at block 360, method 300 may upgrade the database 109 with new schema that matches the database scripts 108. In one embodiment, database schema module 206 may select and install the new database schema from a number of available schemas that are stored locally in data storage 105 or in some other data store. In another embodiment, database schema module 206 may identify a schema compatible with the database scripts 108 and retrieve the schema from some other location (e.g., download the schema from a server over network 102). Once database 109 has been upgraded with the new schema that match the database scripts 108, method 300 may proceed to block 350. As discussed above, at block 350, method 300 may proceed with installing/upgrading the application. In one embodiment, if an error occurs in the schema upgrade at block 360, package manager 112 may generate an error report indicating the error. This error report may be an indication to the requestor that the upgrade should be performed manually.

Figure 4:
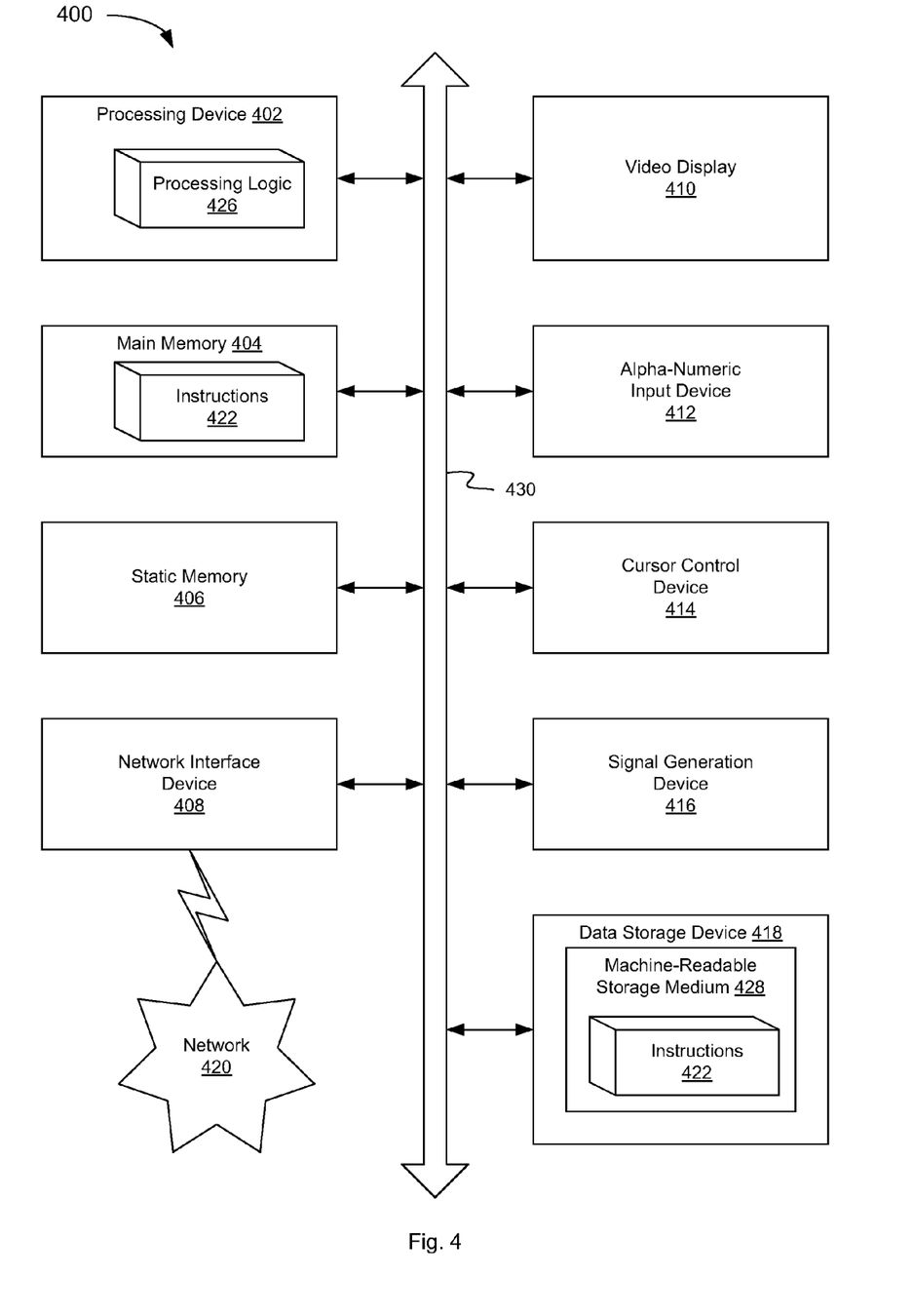
FIG. 4 is a block diagram illustrating a computer system, according to an embodiment.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a computing device, such as client 101, host server 103 or host controller 107 running package manager 112.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428, on which is stored one or more set of instructions 422 (e.g., software) embodying any one or more of the methodologies of functions described herein. The instructions 422 may also reside, completely or at least partially, within the main memory 404 and/or within the processing device 402 during execution thereof by the computer system 400; the main memory 404 and the processing device 402 also constituting machine-accessible storage media. The instructions 422 may further be transmitted or received over a network 420 via the network interface device 408.

The machine-readable storage medium 428 may also be used to store instructions for matching database schema with application code using dependency management, as described herein. While the machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage media (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
receiving a request to install a version of an application on a host server, wherein the version of the application is associated with at least one first database script to be executed on a management database of the host server upon installation of the version of the application to modify a first schema of the management database;
identifying the first schema of the management database by a schema identifier that is calculated in view of a hash value of at least one second database script that created or modified the first schema;
calculating a script version identifier of the first database script in view of a hash value of the first database script;
comparing, by a processing device, the script version identifier of the first database script to the schema identifier of the first schema; and
prior to installing the version of the application, determining, by the processing device, whether the first database script matches the first schema using package dependency management operations of the management database, wherein the first database script matches the first schema when the script version identifier matches the schema identifier.

2. The method of claim 1, wherein:
the host server is in a virtualization system that comprises a plurality of host computers running a plurality of virtual machines associated with a plurality of virtual disks;
the host server is a host controller coupled to the plurality of host computers;
the application comprises a virtualization management application to perform the package dependency management operations in the virtualization system; and
the management database comprises a plurality of entries pertaining to one or more of the plurality of host computers, the plurality of virtual machines, or the plurality of virtual disks.

3. The method of claim 1, wherein the version of the application comprises an upgrade to a previously installed version of the application.

4. The method of claim 1, further comprising:
installing the version of the application in response to determining that the first database script matches the first schema.

5. The method of claim 1, further comprising:
upgrading the management database with a second schema that is compatible with the first database script in response to determining that the first database script does not match the first schema.

6. The method of claim 1, wherein the script version identifier matches the schema identifier when the script version identifier is among a list of script version identifiers that are compatible with the schema identifier.

7. A system comprising:
a memory to store instructions; and
a processing device to execute the instructions to:
receive a request to install a version of an application on a host server, wherein the version of the application is associated with at least one first database script to be executed on a management database of the host server upon installation of the version of the application to modify a first schema of the management database;
identify the first schema of the management database by a schema identifier that is calculated in view of a hash value of at least one second database script that created or modified the first schema;
calculate a script version identifier of the first database script in view of a hash value of the first database script;
compare the script version identifier of the first database script to the schema identifier of the first schema; and prior to installation of the version of the application, determine whether the first database script matches the first schema using package dependency management operations of the management database, wherein the first database script matches the first schema when the script version identifier matches the schema identifier.

8. The system of claim 7, wherein the application comprises a virtualization management application.

9. The system of claim 7, wherein the version of the application comprises an upgrade to a previously installed version of the application.

10. The system of claim 7, the processing device is further to:
install the version of the application in response to a determination that the first database script matches the first schema.

11. The system of claim 7, the processing device is further to:
upgrade the management database with a second schema that is compatible with the first database script in response to a determination that the first database script does not match the first schema.

12. The system of claim 7, wherein the script version identifier matches the schema identifier when the script version identifier is among a list of script version identifiers that are compatible with the schema identifier.

13. A non-transitory machine-readable storage medium storing instructions that, when executed by a processing device, cause the processing device to:
receive a request to install a version of an application on a host server, wherein the version of the application is associated with at least one first database script to be executed on a management database of the host server upon installation of the version of the application to modify a first schema of the management database;
identify the first schema of the management database by a schema identifier that is calculated in view of a hash value of at least one second database script that created or modified the first schema;
calculate a script version identifier of the first database script in view of a hash value of the first database script;
compare, by the processing device, the script version identifier of the first database script to the schema identifier of the first schema; and
prior to installation of the version of the application, determine, by the processing device, whether the first database script matches the first schema using package dependency management operations of the management database, wherein the first database script matches the first schema when the script version identifier matches the schema identifier.

14. The non-transitory machine-readable storage medium of claim 13, wherein the application comprises a virtualization management application.

15. The non-transitory machine-readable storage medium of claim 13, wherein the version of the application comprises an upgrade to a previously installed version of the application.

16. The non-transitory machine-readable storage medium of claim 13, wherein the processing device is further to:
install the version of the application in response to a determination that the first database script matches the first schema.

17. The non-transitory machine-readable storage medium of claim 13, wherein the processing device is further to:
upgrade the management database with a second schema that is compatible with the first database script in response to a determination that the first database script does not match the first schema.

18. The non-transitory machine-readable storage medium of claim 13, wherein the script version identifier matches the schema identifier when the script version identifier is among a list of script version identifiers that are compatible with the schema identifier.

* * * * *